(12) United States Patent
Furui (10) Patent No.: US 7,146,863 B2
(45) Date of Patent: Dec. 12, 2006

(54) TORSION ANGLE MEASURING METHOD AND DEVICE FOR MAGNETIC-DISK SUSPENSION

(75) Inventor: Toshikazu Furui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 19 days.

(21) Appl. No.: 11/039,951

(22) Filed: Jan. 24, 2005

(65) Prior Publication Data

US 2005/0126301 A1 Jun. 16, 2005

Related U.S. Application Data

(63) Continuation of application No. PCT/JP2003/00914, filed on Jan. 30, 2003.

(51) Int. Cl.
*G01N 3/22* (2006.01)
*G11B 21/00* (2006.01)

(52) U.S. Cl. .................. 73/847; 73/855; 73/865.3; 73/865.9

(58) Field of Classification Search .............. 73/847
See application file for complete search history.

(56) References Cited

U.S. PATENT DOCUMENTS

| | | | | |
|---|---|---|---|---|
| 5,742,446 A | * | 4/1998 | Tian et al. | 360/75 |
| 5,856,624 A | * | 1/1999 | Elsing | 73/865.9 |
| 6,453,722 B1 | * | 9/2002 | Liu et al. | 73/9 |
| 2003/0235012 A1 | * | 12/2003 | Nishizawa | 360/264.2 |
| 2006/0060002 A1 | * | 3/2006 | Stamm et al. | 73/862.08 |

FOREIGN PATENT DOCUMENTS

| | | | |
|---|---|---|---|
| JP | 10-228742 | | 8/1998 |
| JP | 10228742 A | * | 8/1998 |
| JP | 10-269358 | | 10/1998 |
| JP | 2002-074630 | | 3/2002 |

OTHER PUBLICATIONS

Office Action mailed Sep. 12, 2006 in the corresponding Japanese patent Application No. 2004-544171 (with partial English translation).

* cited by examiner

*Primary Examiner*—Edward Lefkowitz
*Assistant Examiner*—Freddie Kirkland, III
(74) *Attorney, Agent, or Firm*—Armstrong, Kratz, Quintos, Hanson & Brooks, LLP

(57) ABSTRACT

In a torsion angle measuring method and device for a magnetic-disk suspension, a datum surface of the suspension is fixed to a fixture under pressure, the fixture being provided with a smooth criterion surface having known torsion angles set for the suspension datum surface. A roll angle and a pitch angle of a slider loading surface of the suspension to the datum surface when the suspension is fixed to the fixture are measured.

4 Claims, 11 Drawing Sheets

FIG.4 delta THETA-r = f (delta X, delta Y, delta Z)
delta THETA-p = g (delta X, delta Y, delta Z)

TORSION ANGLE MEASURING METHOD AND DEVICE FOR MAGNETIC-DISK SUSPENSION

CROSS-REFERENCE TO RELATED APPLICATIONS

This application is a U.S. continuation application which is filed under 35 USC 111(a) and claims the benefit under 35 USC 120 and 365(c) of International Application No. PCT/JP2003/00914, filed on Jan. 30, 2003, the entire contents of which are hereby incorporated by reference.

BACKGROUND OF THE INVENTION

1. Field of the Invention

The present invention relates to a torsion angle measuring method and device for measuring the torsion angle (or torsion angles in the roll direction and the pitch direction) of a magnetic-disk suspension which is a component part of a magnetic disk device, such as a hard disk drive.

2. Description of the Related Art

The method of measuring the torsion angle of a magnetic-disk suspension in the roll direction or the pitch direction is usually to measure the torsion angle of the slider surface (or the slider loading surface on which the slider is carried) to the suspension datum surface. Hereinafter, the torsion angle in the roll direction is called roll angle, and the torsion angle in the pitch direction is called pitch angle.

By using the measurement unit employing the laser displacement gage, the autocollimator, or the optical interference method, the angle measurement is carried out at the two places: the suspension datum surface and the slider loading surface. The measurement value is obtained by computing the difference between the two angles measured.

Moreover, there is also another method of measuring the torsion angle using the false lifted state of the suspension. In this method, the load pin whose loading edge is formed into the spherical surface comes in contact with the suspension at one point, so that the suspension is set in the false lifted state. And the torsion angle in the false lifted state of the suspension is measured. The false lifted state means the posture state of the suspension which imitates the actual state of the suspension where it is lifted from the magnetic disk surface when the magnetic head actually accesses the magnetic disk.

Figure 5:
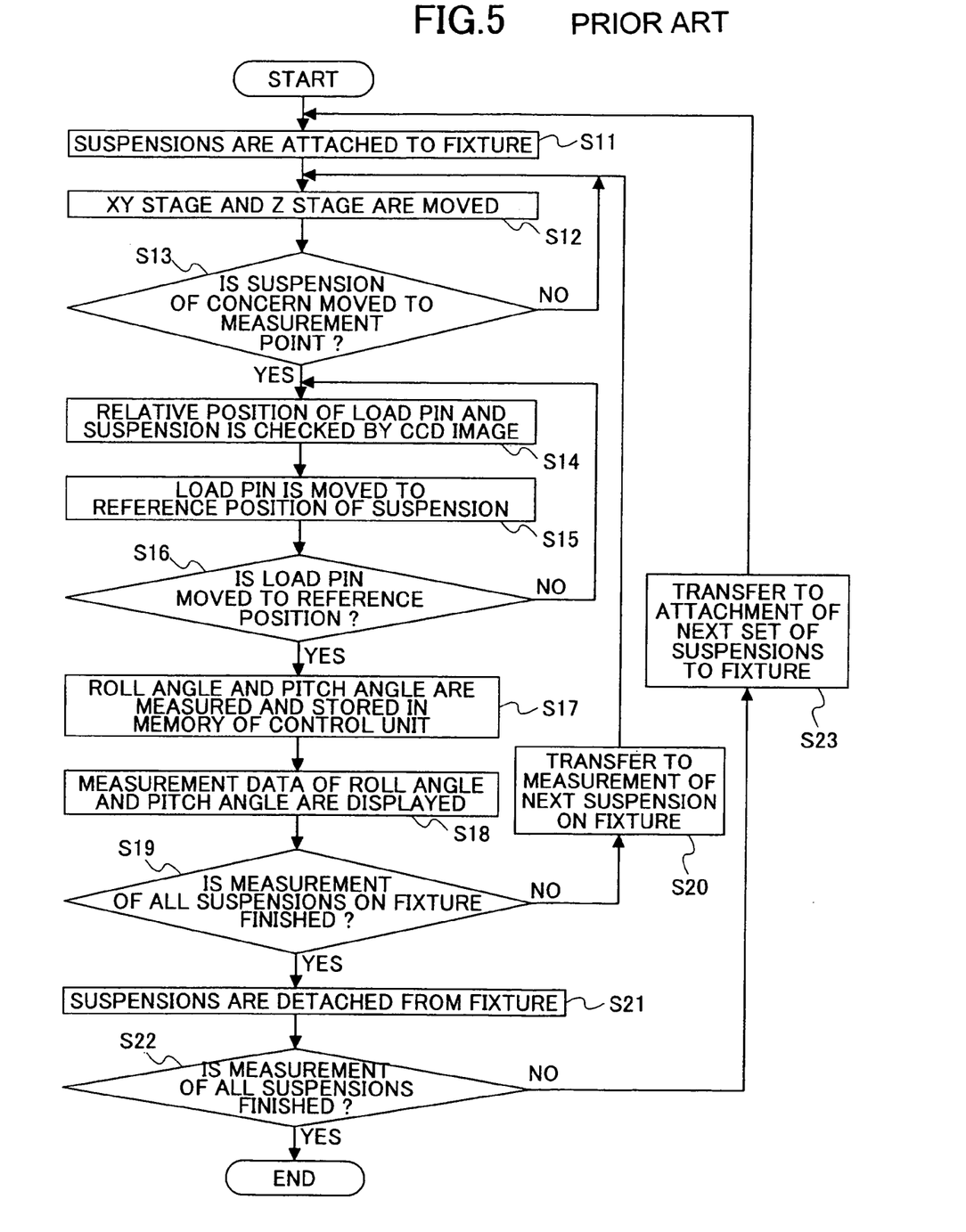
FIG. 5 is a flowchart for explaining the measurement procedure of the conventional suspension torsion angle measuring method.
Figure 10:
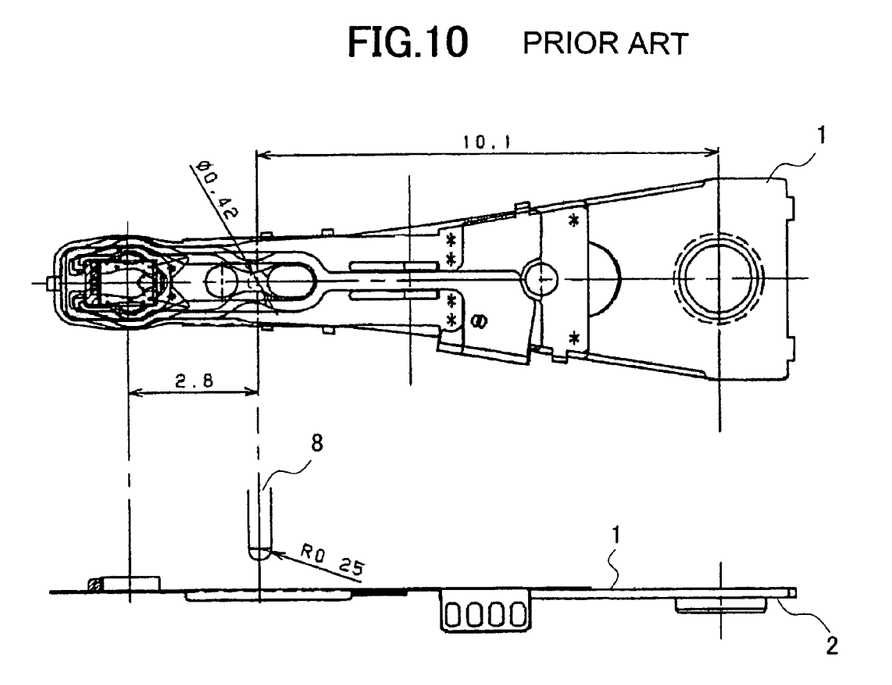
FIG. 10 is a diagram showing an example of the magnetic-disk suspension used as the measuring object.

FIG. 5 is a flowchart for explaining the measurement procedure of the conventional torsion angle measuring method. FIG. 10 shows an example of the magnetic-disk suspension which is used as the measuring object.

As shown in FIG. 10, the suspension 1 comprises the datum surface 2 on the undersurface of the side (the right-hand side of FIG. 10) where the suspension 1 is attached to the magnetic disk device, and the slider loading surface at the leading edge of the opposite side (the left-hand side of FIG. 10) where the slider is carried. Moreover, the suspension 1 is provided with a predetermined position where the spherical-form edge of the load pin 8 comes in contact with the suspension 1 in performing the torsion angle measurement. Hereinafter, this predetermined position is called the reference position of the suspension for the load pin.

In the measurement procedure of FIG. 5, it is assumed that the fixture is provided so that the predetermined number of the suspensions (one lot) can be attached to the fixture, and that the torsion angles in the roll direction and the pitch direction for each of the suspensions on the fixture are measured continuously.

As shown in FIG. 5, the suspensions of the predetermined number (one lot) are attached to the fixture at step S11. The fixture is formed with a level criterion surface, and the plurality of suspensions are mounted on the criterion surface of the fixture at a time.

At step S12, the XY stage and the Z stage which are provided in the torsion angle measuring device are moved. The fixture and the plurality of suspensions on these stages are also moved.

At step S13, it is determined whether the movement to the measurement point of the suspension of concern (the measuring object) for measurement of the roll angle and pitch angle is completed. When the movement is not completed yet, control is returned to the step S12.

When the movement to the measurement point is completed, at step S14, the relative position of the load pin and the suspension is checked by the CCD image.

At step S15, the load pin is moved to the reference position of the suspension.

At step S16, it is determined whether the load pin is moved to the reference position of the suspension.

When the movement of the load pin is not completed yet, control is returned to the steps S14 and S15 so that movement of the load pin to the reference position of the suspension is performed again.

When the movement of the load pin is completed, at step S17, the roll angle "theta-r" and the pitch angle "theta-p" of the slider loading surface in the suspension to the datum surface are measured using the angle measuring instrument, and the measurement data is stored in the memory of the control unit (computer).

In the step S17, the angle measurement of the datum surface 2 of the suspension 1 fixed to the fixture and the angle measurement of the slider loading surface of the suspension 1 are performed, and the roll angle and the pitch angle are obtained by computing the difference of these angles as the torsion angle.

Therefore, when the torsion angles of the plurality of suspensions are measured, it is necessary to perform, for each of the plurality of suspensions, the positioning to move the load pin to the reference position of each suspension, the angle measurement of the datum surface 2, and the angle measurement of the slider loading surface.

At step S18, the measurement data "theta-r" of the roll angle and the measurement data "theta-p" of the pitch angle are displayed on the display monitor of the control unit.

At step S19, it is determined whether the measurement of the torsion angle is completed for all of the plurality of suspensions on the fixture.

When the result at step S19 is affirmative, control is shifted to the following step S21.

When the result at step S19 is negative, at step S20, control is shifted to the torsion angle measurement of the next suspension on the fixture, and the procedure of the steps S12 to S19 is repeated.

At step S21, the suspensions of the predetermined number (one lot) are detached from the fixture.

At step S22, it is determined whether the torsion angle measurement is finished for all the suspensions (all the lots).

When the result at step S22 is affirmative, the measurement procedure of FIG. 5 is terminated.

When the result at step S22 is negative, at step S23, control is shifted to the torsion angle measurement of the suspensions of the following lot, and the procedure of the steps S11 to S21 is repeated.

In recent years, with improvement of the recording density of the hard disk drive, a higher level of precision is demanded for the suspension machining. For this reason, the following problems arise: (1) the measurement process capability, and (2) the measurement error in the measurement using the false lifted state.

Concerning the measurement process capability, improvement in the throughput of the measuring devices must be aimed at. Although the quality of the torsion angle of the suspension was conventionally assured by the sampling inspection, it is now necessary to carry out the total inspection.

Concerning the measurement error in the measurement using the false lifted state, it is difficult to reduce the measurement error without decreasing the measurement process efficiency. In case the false lifted state is created by the load pin in the torsion angle measurement of the suspension, if the load pin in contact at the specified position (X, Y, Z coordinates) of the suspension is not-fixed, the posture state of the suspension will differ from the actual lifted state which is originally intended, and the torsion angle of the suspension in the wrong state will be measured so that the measurement error will be produced. Usually, in such a case, the measurement is performed after adjustment of the relative position between the load pin and the suspension is performed. However, worsening the measurement process efficiency is not avoided due to the time needed to perform the adjustment.

SUMMARY OF THE INVENTION

An object of the present invention is to provide an improved torsion angle measuring method and device in which the above-described problems are eliminated.

Another object of the present invention is to provide a magnetic-disk suspension torsion angle measuring method and device which is capable of reducing the measurement error in the false lifted state while raising the measurement process efficiency in the torsion angle measurement of the magnetic-disk suspension.

In order to achieve the above-mentioned objects, the present invention provides a torsion angle measuring method for a magnetic-disk suspension, the torsion angle measuring comprising the steps of: fixing a datum surface of the suspension to a fixture under pressure, the fixture being provided with a smooth criterion surface having known torsion angles set for the suspension datum surface; and measuring a roll angle and a pitch angle of a slider loading surface of the suspension to the datum surface when the suspension is fixed to the fixture.

The above-mentioned torsion angle measuring method may be configured so that the method further comprises the steps of: setting the suspension in a false lifted state by placing a load pin having a spherical-form leading edge in contact with the suspension at a reference position thereof; and computing relation functions obtained from amounts of change of the roll angle and the pitch angle of the suspension when a relative position between the suspension and the load pin is changed.

The above-mentioned torsion angle measuring method may be configured so that, when the amount of change of the relative position between the suspension and the load pin is known, approximated measurement values of the roll angle and the pitch angle of the suspension with the load pin being set at the reference position are computed based on the relation functions computed in the computing step and measurement values of the roll angle and the pitch angle actually obtained by performing the measuring step without moving the load pin.

In order to achieve the above-mentioned objects, the present invention provides a torsion angle measuring device which measures a roll angle and a pitch angle of a slider loading surface of a magnetic-disk suspension to a datum surface of the suspension, the torsion angle measuring device comprising: a fixture provided with a smooth criteria surface having known torsion angles set for the datum surface of the suspension; a mounting mechanism fixing the datum surface of the suspension to the criteria surface of the fixture under pressure; a measurement unit measuring a roll angle and a pitch angle of a slider loading surface of the suspension to the datum surface when the suspension is fixed to the fixture; a load pin having a spherical-form leading edge; a load-pin moving unit setting the suspension in a false lifted state by placing the load pin in contact with the suspension at a reference position thereof; and a computation unit computing relation functions obtained from amounts of change of the roll angle and the pitch angle of the suspension when a relative position between the suspension and the load pin is changed.

The above-mentioned torsion angle measuring device may be configured so that, when the amount of change of the relative position between the suspension and the load pin is known, approximated measurement values of the roll angle and the pitch angle of the suspension with the load pin being set at the reference position are computed based on the relation functions computed by the computation unit and measurement values of the roll angle and the pitch angle actually obtained by the measurement unit without moving the load pin.

According to the magnetic-disk suspension torsion angle measuring method and device of the present invention, the fixture is provided with the criterion surface having the known roll angle and the known pitch angle for the datum surface of the suspension, and the datum surface of the suspension is in contact with the criterion surface of the fixture. Since the roll angle and pitch angle of the datum surface of the suspension are in agreement with those of the criterion surface of the fixture, it is unnecessary to newly measure the roll angle and pitch angle of the suspension datum surface as performed by the conventional measuring method. For this reason, the angle measurement of suspension datum surface becomes unnecessary, and it is possible to reduce the acquisition time of measurement data per suspension remarkably.

Moreover, if the relative position between the suspension and the load pin when the suspension is fixed to the fixture is known and the amounts of change of the roll angle and the pitch angle of the suspension resulting from the load pin position displacement are known, then it is not necessary to perform positioning of the suspension and the load pin on each occasion of the measurement. It is possible to determine the accurate roll angle and pitch angle of the suspension by introducing the compensation values based on the relation functions of the torsion angle change to the load pin displacement.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of the preferred embodiments of the invention with reference to the accompanying drawings.

Figure 1:
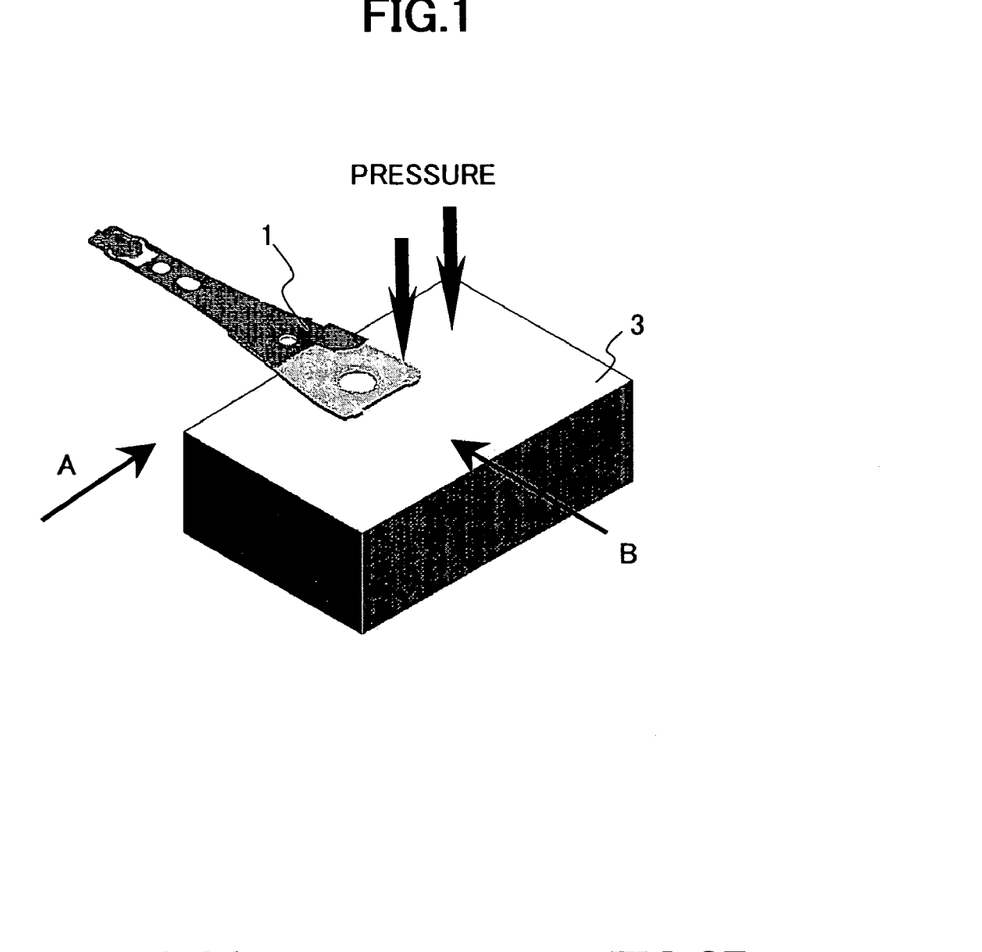
FIG. 1 is a perspective view of the magnetic-disk suspension and the fixture used in the magnetic-disk suspension torsion angle measuring method according to the invention.

FIG. 1 shows the magnetic-disk suspension and the fixture which are used in the torsion angle measuring method according to the present invention.

Figure 2A:
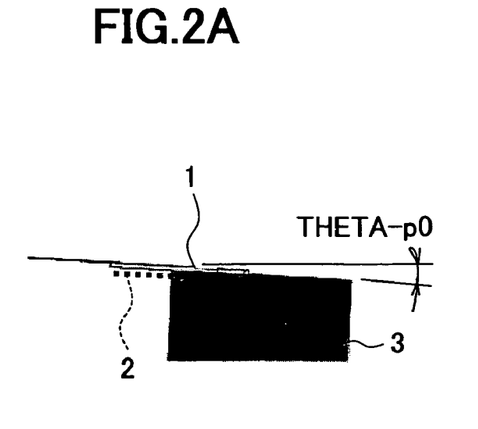
FIG. 2A is a diagram showing the magnetic-disk suspension and the fixture when viewed from the direction indicated by the arrow A in FIG. 1.
Figure 2B:
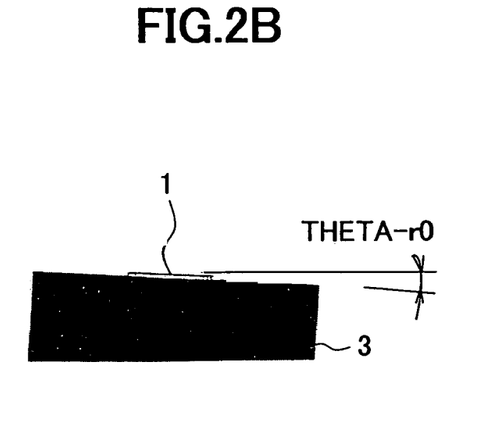
FIG. 2B is a diagram showing the magnetic-disk suspension and the fixture when viewed from the direction indicated by the arrow B in FIG. 1.

FIG. 2A shows the magnetic-disk suspension 1 and the fixture 3 when they are viewed from the direction indicated by the arrow A in FIG. 1. FIG. 2B shows the magnetic-disk suspension 1 and the fixture 3 when they are viewed from the direction indicated by the arrow B in FIG. 1. Moreover, FIG. 3 shows the load pin 8 and the angle measuring instrument 11 which are used in the measuring method of FIG. 1.

As shown in FIG. 1, FIG. 2A and FIG. 2B, the magnetic-disk suspension 1 which is the measuring object is pressed onto the fixture 3 having a smooth criterion surface in which a known roll angle ("theta-r0") and a known pitch angle ("theta-p0") are set for the datum surface 2 of the suspension 1, and pressure is applied to the suspension 1 on the fixture 3.

In this manner, the suspension 1 is fixed to the fixture 3, and the datum surface 2 of the suspension 1 is in conformity with the known roll angle and the known pitch angle of the criterion surface of the fixture 3.

Figure 3:
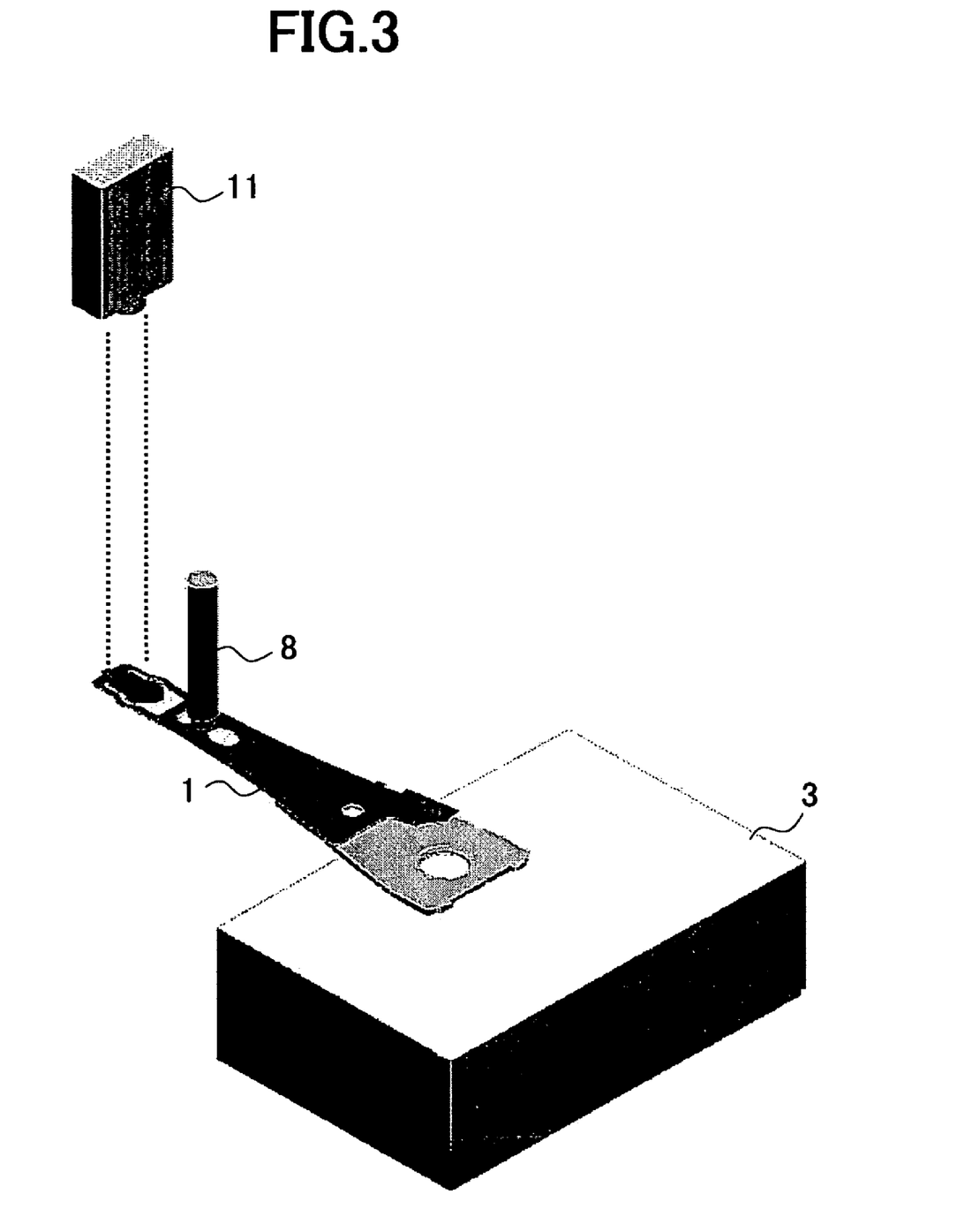
FIG. 3 is a diagram showing the load pin and the angle measuring instrument used in the torsion angle measuring method of FIG. 1.

As shown in FIG. 3, while the suspension 1 is fixed to the fixture 3, the suspension 1 is set in the false lifted state by pressurizing it using the load pin 8.

With the load pin 8 at the reference position (X0, Y0, Z0) of the suspension 1 at this time, the roll angle and pitch angle of the slider loading surface of the suspension 1 are measured using the angle measuring instrument 11. Hereinafter, this measurement of the torsion angle is called the first measurement.

After the load pin 8 is moved from the reference position by the predetermined distance (delta X, delta Y, delta Z) with respect to each of the X, Y, and Z coordinates, the roll angle and pitch angle of the slider loading surface of the suspension 1 are again measured using the angle measuring instrument 11. Hereinafter, this measurement of the torsion angle is called the second measurement.

Based on the results of the first measurement and the second measurement, the amount ("delta theta-r") of change of the roll angle and the amount ("delta theta-p") of change of the pitch angle of the suspension 1 as the measuring object in accordance with the movement distance or displacement (delta X, delta Y, delta Z) of the load pin 8 can be computed.

According to the torsion angle measuring method of the present invention, the relation functions f and g are determined based on the calculation values of the amounts of change of the roll angle and the pitch angle.

Next, a description will be given of the relation functions f and g with reference to FIG. 4.

Figure 4:
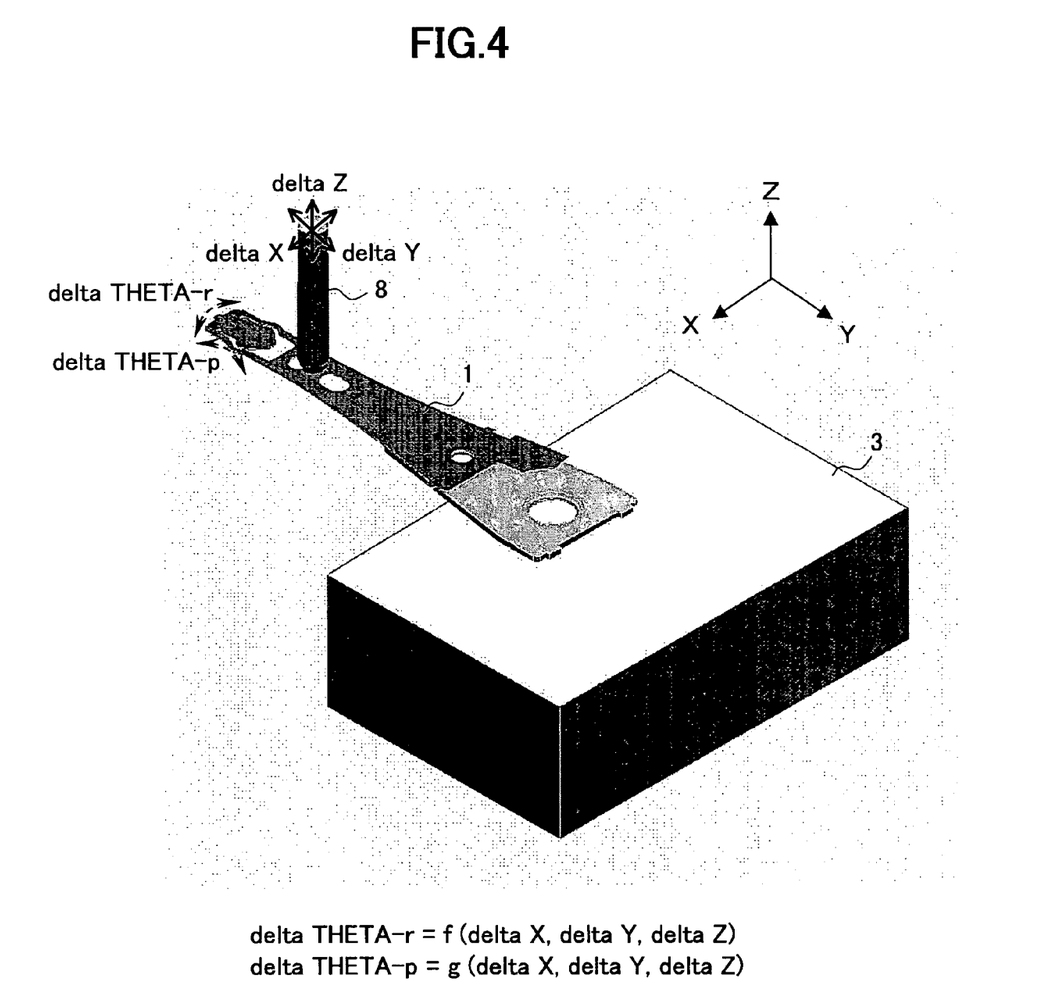
FIG. 4 is a diagram for explaining the principle of the magnetic-disk suspension torsion angle measuring method according to the invention.

FIG. 4 is a diagram for explaining the principle of the magnetic-disk suspension torsion angle measuring method in the preferred embodiment of the invention.

First, assuming that the coordinates of the reference position of the load pin 8 are (X0, Y0, Z0), the position coordinates (Xn, Yn, Zn) when the load pin 8 is moved from the reference position relative to the suspension 1 are generally expressed as follows.

Xn: X0, X1, X2, ..., Xp (p+1) places;
Yn: Y0, Y1, Y2, ..., Yq (q+1) places;
Zn: Z0, Z1, Z2, ..., Zr (r+1) places.

Therefore, the number of the position coordinates requiring the torsion angle measurement is the (p+1)×(q+1)×(r+1) places in total.

Assuming that X, Y, and Z are the independent variables, the relation function f of the roll angle "theta-r" of the suspension is represented by the following formula:

$$\text{theta-}r = f(X, Y, Z) = a(X-\text{alpha})^n + b(Y-\text{beta})^m + c(Z-\text{gamma})^l$$

where a, b, c, alpha, beta, gamma, n, m, and l are arbitrary real numbers.

When the amounts of change of X, Y, and Z are sufficiently small values compared with the outside dimensions of the suspension 1, the above relation function f can be approximated by the following formula:

$$\text{theta-}r = f(X, Y, Z) = aX + bY + cZ + d \tag{1}$$

Among the coefficients (a, b, c, d) of the above formula (1), the coefficient a can be determined based on the (p+1) items of the measurement data, the coefficient b can be determined based on the (q+1) items of the measurement data, and the coefficient c can be determined based on the (r+1) items of the measurement data using the least-squares method, respectively.

Similarly, the relation function g of the pitch angle "theta-p" of the suspension 1 can be approximated by the following formula:

$$\text{theta-}p = g(X, Y, Z) = hX + iY + jZ + k \tag{2}$$

Among the coefficients (h, i, j, k) of the above formula (2), the coefficient h can be determined based on the (p+1) items of the measurement data, the coefficient i can be determined based on the (q+1) items of the measurement data, and the coefficient j can be determined based on the (r+1) items of the measurement data using the least-squares method, respectively.

Therefore, the amount ("delta theta-r") of change of the roll angle and the amount ("delta theta-p") of change of the pitch angle according to the displacement (delta X, delta Y, delta Z) of the load pin 8 can be computed based on the measurement results of the roll angle and the pitch angle of the suspension 1.

Based on the calculation values of the amounts of change of the roll angle and the pitch angle, the respective coefficient values of the above formulas (1) and (2) (the relation functions f and g) can be computed using the least-squares method, and the relation functions f and g of the roll angle and the pitch angle of the suspension 1 can be determined.

When the plurality of suspensions are disposed on the fixture in the actual measurement, it is necessary to determine the displacement (delta X, delta Y, delta Z) of the position coordinate where the load pin originally contacts the suspension by measuring the position coordinates (X, Y, Z) of the vertex at the spherical-form edge of the load pin 8 beforehand with respect to each of the respective measurement points, or by acquiring the relative position information of the suspension 1 and the load pin 8 using the image recognition device.

Once the relation functions f and g of the roll angle and pitch angle of the suspension 1 are determined, it is possible to measure automatically the roll angle and the pitch angle of the slider loading surface of each of the plurality of the suspensions by continuously performing the procedure which is the same as that of the first measurement mentioned above, without moving the load pin 8.

The roll angle and the pitch angle in the case of the suspension in which the load pin is originally at the position coordinate where it is contacted and loaded are computed by adding as the compensation values the roll angle and the pitch angle, which are the amounts of change of the roll angle and the pitch angle equivalent to the predetermined displacement (delta X, delta Y, delta Z), to the roll angle and the pitch angle which are actually measured in the above-mentioned procedure respectively.

By subtracting the known roll angle and the known pitch angle ("theta-r0", "theta-p0") of the criterion surface of the fixture 3 from the thus corrected roll angle and pitch angle, the roll angle and pitch angle of the slider loading surface of the suspension to the datum surface thereof are computed.

Figure 6A:
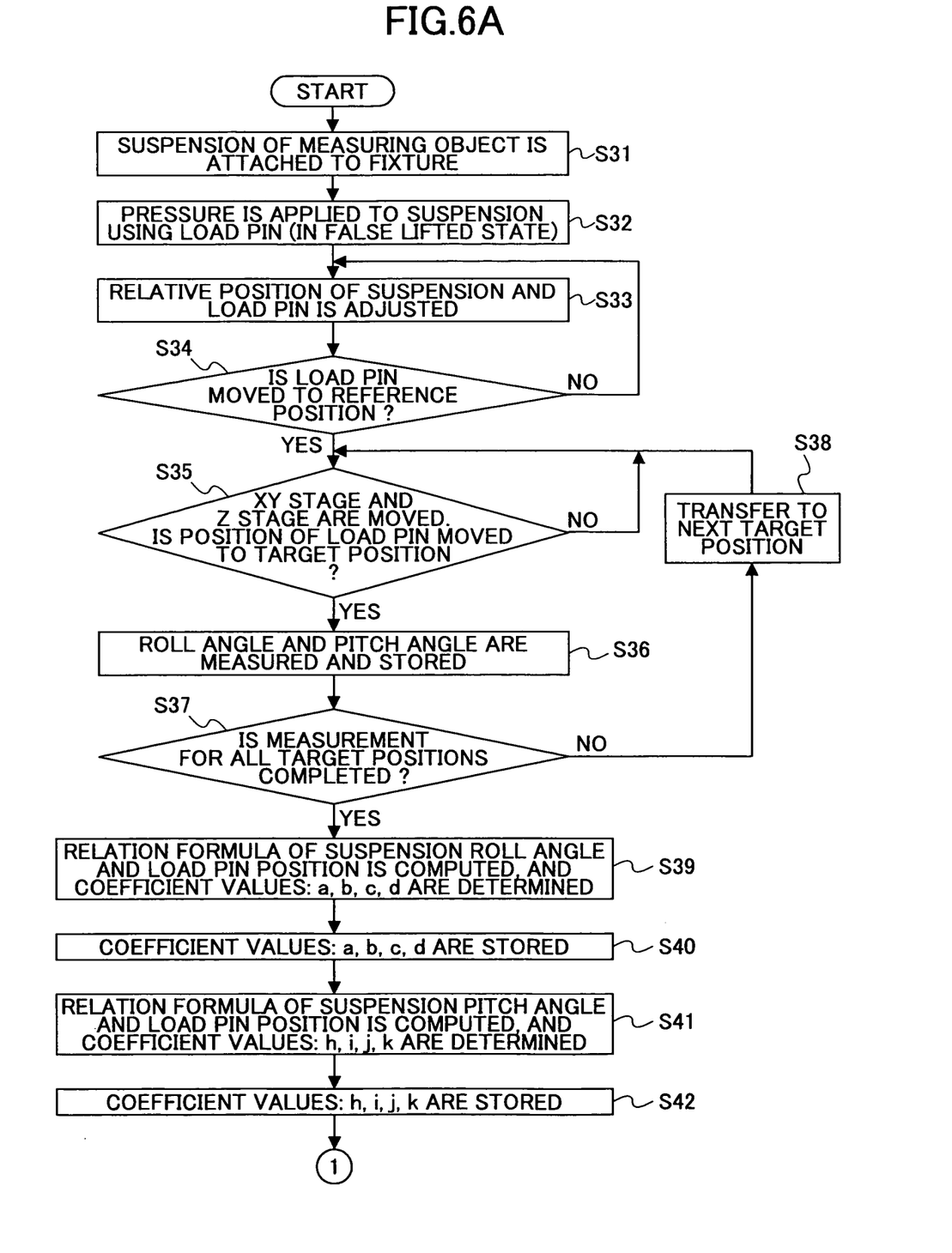
FIG. 6A, FIG. 6B, and FIG. 6C are a flowchart for explaining the measurement procedure of the magnetic-disk suspension torsion angle measuring method in the preferred embodiment of the invention.
Figure 6B:
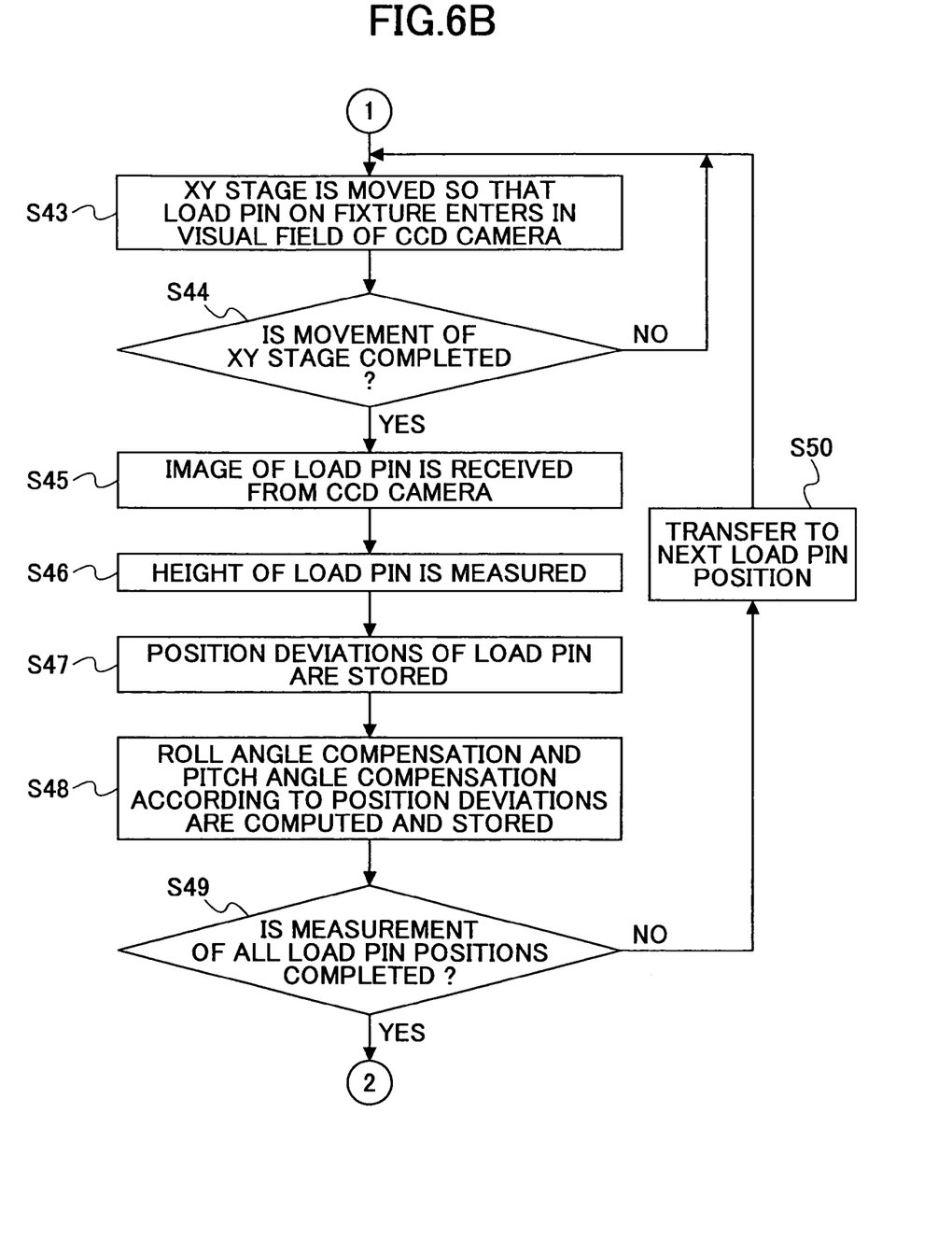
Figure 6C:
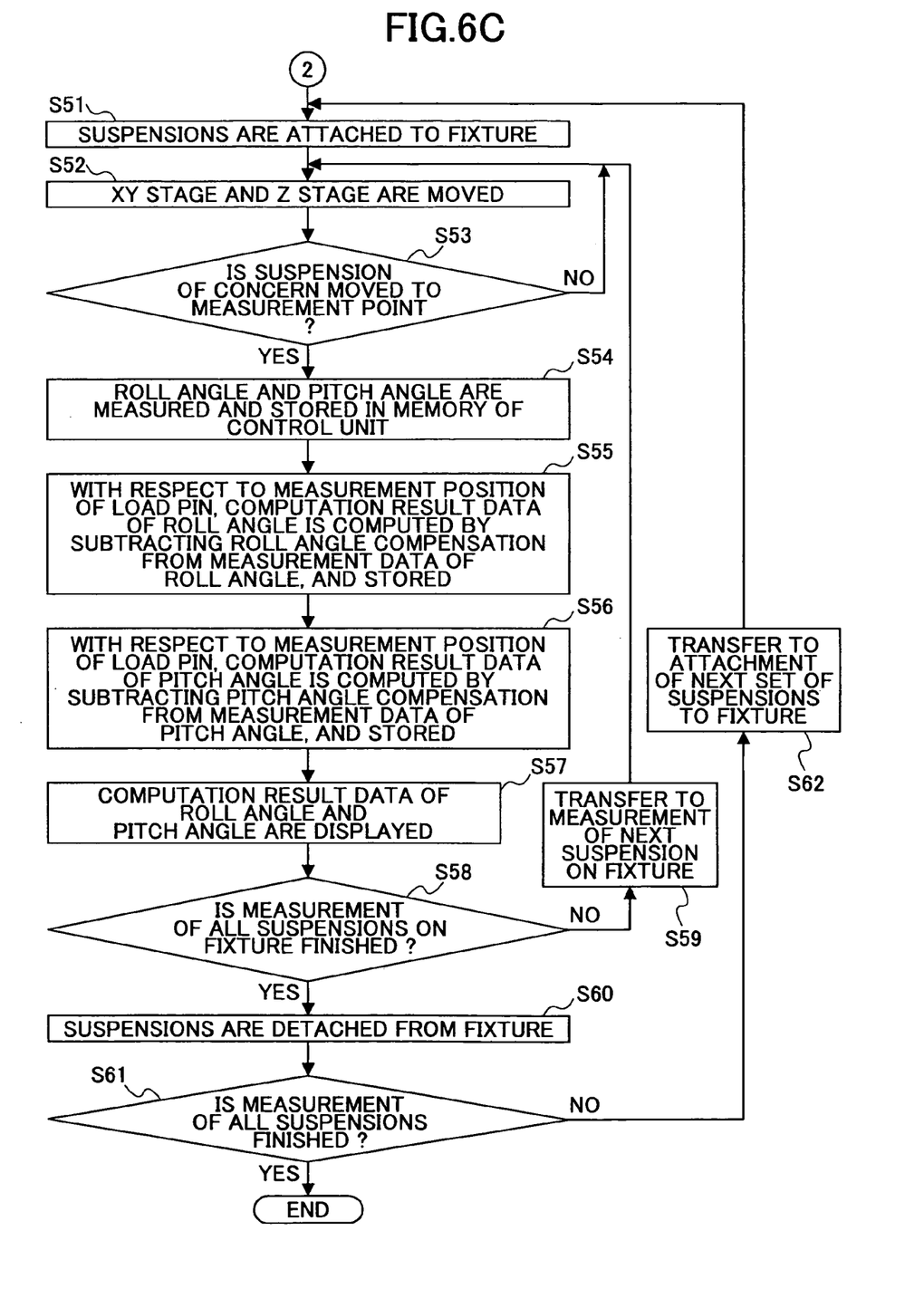

FIG. 6A, FIG. 6B, and FIG. 6C are the flowchart for explaining the measurement procedure of the magnetic-disk suspension torsion angle measuring method in the preferred embodiment of the invention.

FIG. 6A and FIG. 6B show the measurement procedure for determining the characteristic value (relation functions) of the suspension as the measuring object, and FIG. 6C shows the torsion angle measurement procedure for actually measuring the roll angle and the pitch angle for each of the plurality of suspensions.

Each of the measurement procedures to the suspension of the measuring object is performed by the control unit 12 (which will be described later with FIG. 7) provided in the torsion angle measuring device according to the invention.

Upon start of the measurement procedure of FIG. 6A for the suspension characteristic value determination, the suspension 1 of the measuring object is attached to the fixture 3 at step S31.

At step S32, pressure is applied to the suspension 1 using the load pin 8 (loading) so that the suspension 1 is set in the false lifted state.

At step S33, the XY stage is moved and the relative position of the suspension 1 and the load pin 8 is adjusted.

At step S34, it is determined whether the position of the load pin 8 is moved to the reference position (X0, Y0, Z0) of the suspension 1.

When the movement of the load pin 8 is not completed yet, control is returned to the step S33.

When the movement of the load pin 8 is completed, at step S35, the XY stage and the Z stage are moved and it is determined whether the position of the load pin 8 is moved to the target position (Xn, Yn, Zn).

When the movement of the load pin 8 to the target position is not completed yet, the step S35 is performed again.

When the movement of the load pin 8 to the target position is completed, at step S36, the roll angle "theta-r (Xn, Yn, Zn)" and the pitch angle "theta-p (Xn, Yn, Zn)" of the slider loading surface of the suspension 1 are measured using the angle measuring instrument 11, and the data of the measurement results are stored in the memory of the control unit 12.

At step S37, it is determined whether storing of the measurement data of the roll angle and the pitch angle is completed for all the target positions of the load pin 8 which are specified beforehand.

When storing of the measurement data is not completed, at step S38, the load pin 8 is moved to the following target position. And the procedure of the steps S35 to S37 is repeated.

At step S39, based on the measurement data of the amounts of change of the roll angle "theta-r" of the suspension 1 and the data of the position coordinates of the load pin 8, the computation using the least-squares method is performed, and the coefficient values a, b, c, and d of the relation function "theta-r=f(X, Y, Z)" of the upper formula (1) are determined.

At step S40, the data of the coefficient values a, b, c, and d of the relation function f of the upper formula (1) determined at the step S39 are stored in the memory of the control unit 12.

At step S41, based on the measurement data of the amounts of change of the pitch angle "theta-p" of the suspension 1 and the data of the position coordinates of the load pin 8, the computation using the least-squares method is performed, and the coefficient values h, i, j, and k of the relation function "theta-p=g(X, Y, Z)" of the above formula (2) are determined.

At step S42, the data of the coefficient values h, i, j, and k of the relation function g of the above formula (2) determined at the step S41 are stored in the memory of the control unit 12.

After the step S42 is completed, control is shifted to step S43 of the measurement procedure of FIG. 6B.

In the load pin position measurement procedure of FIG. 6B, at step S43, the XY stage is moved so that the load pin 8 on the fixture 3 enters the visual field of the CCD camera.

At step S44, it is determined whether the movement of the XY stage is completed.

When the movement is completed, control is shifted to the following step S45.

When the movement is not completed yet, control is returned to the step S43.

At step S45, the CCD camera is controlled so that the image of the load pin 8 is acquired, and the image data is stored in the memory of the control unit 12.

At step S46, the displacement gage is controlled, the height of the load pin 8 is measured, and the measurement data of the height is stored in the memory of the control unit 12.

At step S47, the data of the amounts of position deviations of the load pin 8 (delta X, delta Y, delta Z) are stored in the memory of the control unit 12. The amounts of position deviations (delta X, delta Y) in the direction of X and the direction of Y are computed from the data of the displacement of the XY stage and the image-processing data of the CCD image created by the control unit 12. The amount of position deviation (delta Z) in the direction of Z is measured directly by the displacement gage.

At step S48, the amount of roll angle compensation and the amount of pitch angle compensation in accordance with the amounts of position deviations (delta X, delta Y, delta Z) are calculated by the control unit 12, and the data of the computation result are stored in the memory of the control unit 12.

At step S49, it is determined whether the load pin position measurement is completed for all the plurality of suspensions on the fixture 3. When the result at step S49 is affirmative, control is shifted to step S51 of FIG. 6C.

When the result at step S49 is negative, at step S50, control is shifted to the load pin position measurement for the following suspension, and the measurement procedure of the steps S43 to S49 is repeated.

In the torsion angle measurement procedure of FIG. 6C, it is assumed that the fixture 3 is provided so that the predetermined number of the suspensions (one lot) can be attached to the fixture 3, and that all the respective torsion angles of the plurality of suspensions of one lot are measured at a time without moving the load pin 8 to each suspension.

As shown in FIG. 6C, the suspensions of the predetermined number (one lot) are attached to the fixture 3 at step S51.

At step S52, the XY stage and the Z stage are moved.

At step S53, it is determined whether movement of the suspension of the measuring object to the measurement point where the roll angle and the pitch angle are measured is completed.

When the movement is not completed yet, control is returned to the step S52.

When the movement to the measurement point is completed, at step S54, the roll angle "theta-r" and the pitch angle "theta-p" of the suspension are measured using the angle measuring instrument 11, and the measurement data are stored in the memory of the control unit 12.

At step S55, with respect to the measurement position of the load pin 8, the computation ("theta-r"–"delta theta-r") which is obtained by subtracting the roll angle compensation value "delta theta-r" from the roll angle measured value "theta-r" is performed, and the data "theta-rr" of the roll angle computation result is stored in the memory of the control unit 12.

At step S56, with respect to the measurement position of the load pin 8, the computation ("theta-p"–"delta theta-p") which is obtained by subtracting the pitch angle compensation value "delta theta-p" from the pitch angle measured value "theta-p" is performed, and the data "theta-pr" of the pitch angle computation result is stored in the memory of the control unit 12.

At step S57, the data "theta-rr" of the roll angle computation result and the data "theta-pr" of the pitch angle computation result are displayed on the display monitor of the control unit 12.

At step S58, it is determined whether the torsion angle measurement is completed for all the suspensions on the fixture 3.

When the result at step S58 is affirmative, control is shifted to the following step S60.

When the result at step S58 is negative, at step S59, control is shifted to the torsion angle measurement of the following suspension, and the measurement procedure of the steps S52 to S58 is repeated.

At step S60, the suspensions of the predetermined number (one lot) are detached from the fixture 3.

At step S62, it is determined whether the torsion angle measurement is completed for all the suspension of all the lots. When the result at step S62 is affirmative, the measurement procedure of FIG. 6C is terminated.

When the result at step S62 is negative, at step S62, control is shifted to the torsion angle measurement of the suspensions of the following lot, and the measurement procedure of the steps S51 to S61 is repeated.

According to the torsion angle measuring method of the above embodiment, the fixture 3 is provided with the criterion surface which has the known roll angle and the known pitch angle for the datum surface 2 of the suspension 1, and the datum surface 2 of the suspension 1 is in contact with the criterion surface of the fixture 3. Since the roll angle and the pitch angle of the datum surface 2 of the suspension 1 are in agreement with the roll angle and the pitch angle of the criterion surface of the fixture 3, it is no longer necessary to newly perform the angle measurement of the suspension datum surface as performed by the conventional measuring method. For this reason, the angle measurement of the suspension datum surface 2 becomes unnecessary, and the acquisition time of measurement data per suspension can be shortened remarkably.

Moreover, if the relative position between the suspension 1 and the load pin 8 when the suspension 1 is fixed to the fixture 3 is known and the amounts of change of the roll angle and the pitch angle of the suspension resulting from load pin position displacement are known, it is not necessary to perform positioning of the suspension 1 and the load pin 8 on each occasion of the measurement. It is possible to determine the accurate roll angle and pitch angle of the actual suspension by introducing the compensation values based on the relation functions f and g.

According to the magnetic-disk suspension torsion angle measuring method of the present invention, when the plurality of suspensions are attached to the same fixture and the torsion angle measurement of them is performed at a time, the mechanism for moving the load pin 8 relative to the fixture 3 for each of the respective suspensions independently is no longer required, and the procedure which needs the load pin movement may be omitted. The measuring time of the torsion angle can be shortened remarkably, and at the same time the mechanism of the torsion angle measuring device can be simplified.

Figure 7:
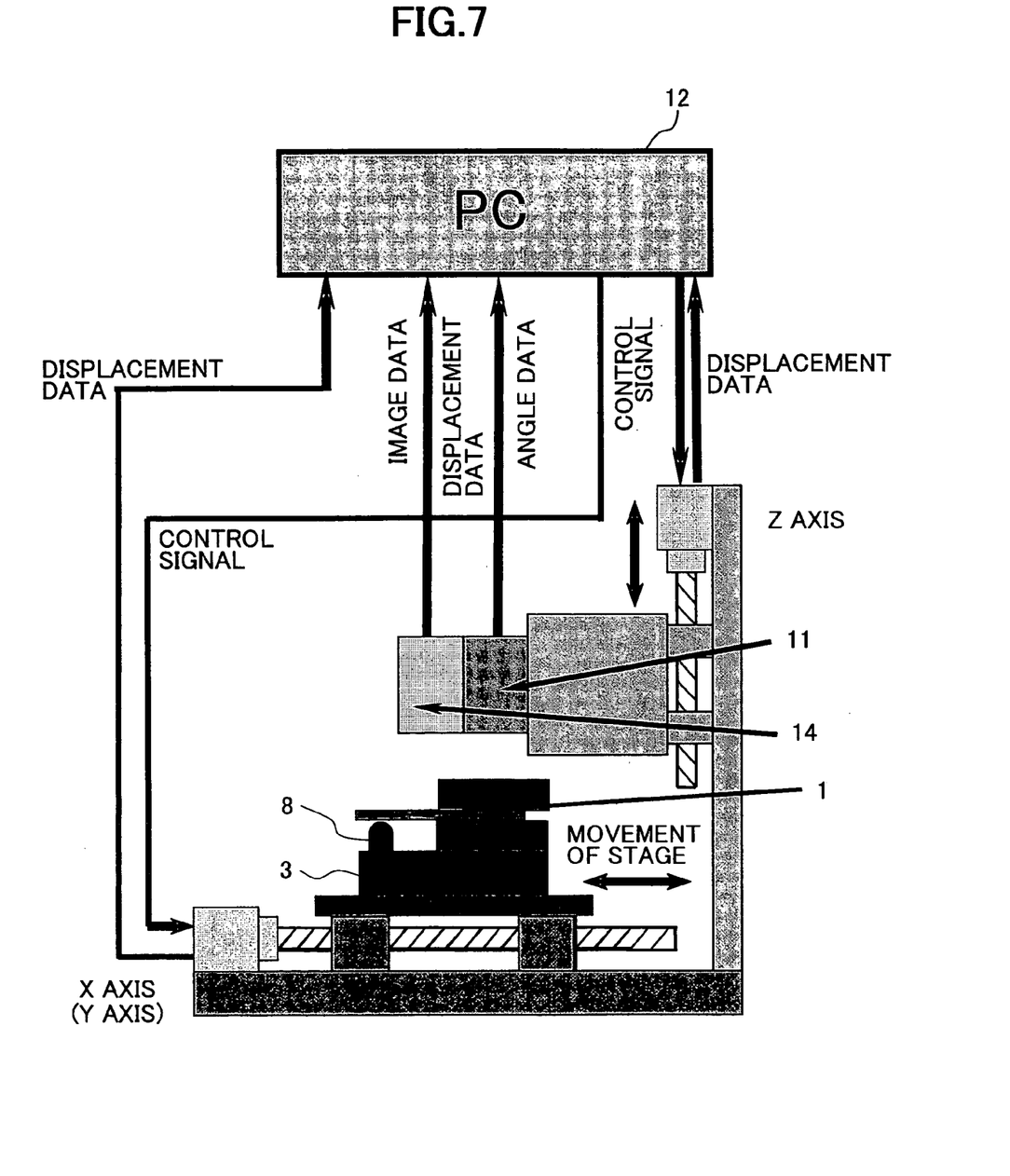
FIG. 7 is a diagram showing the composition of the magnetic-disk suspension torsion angle measuring device in the preferred embodiment of the invention.
Figure 8:
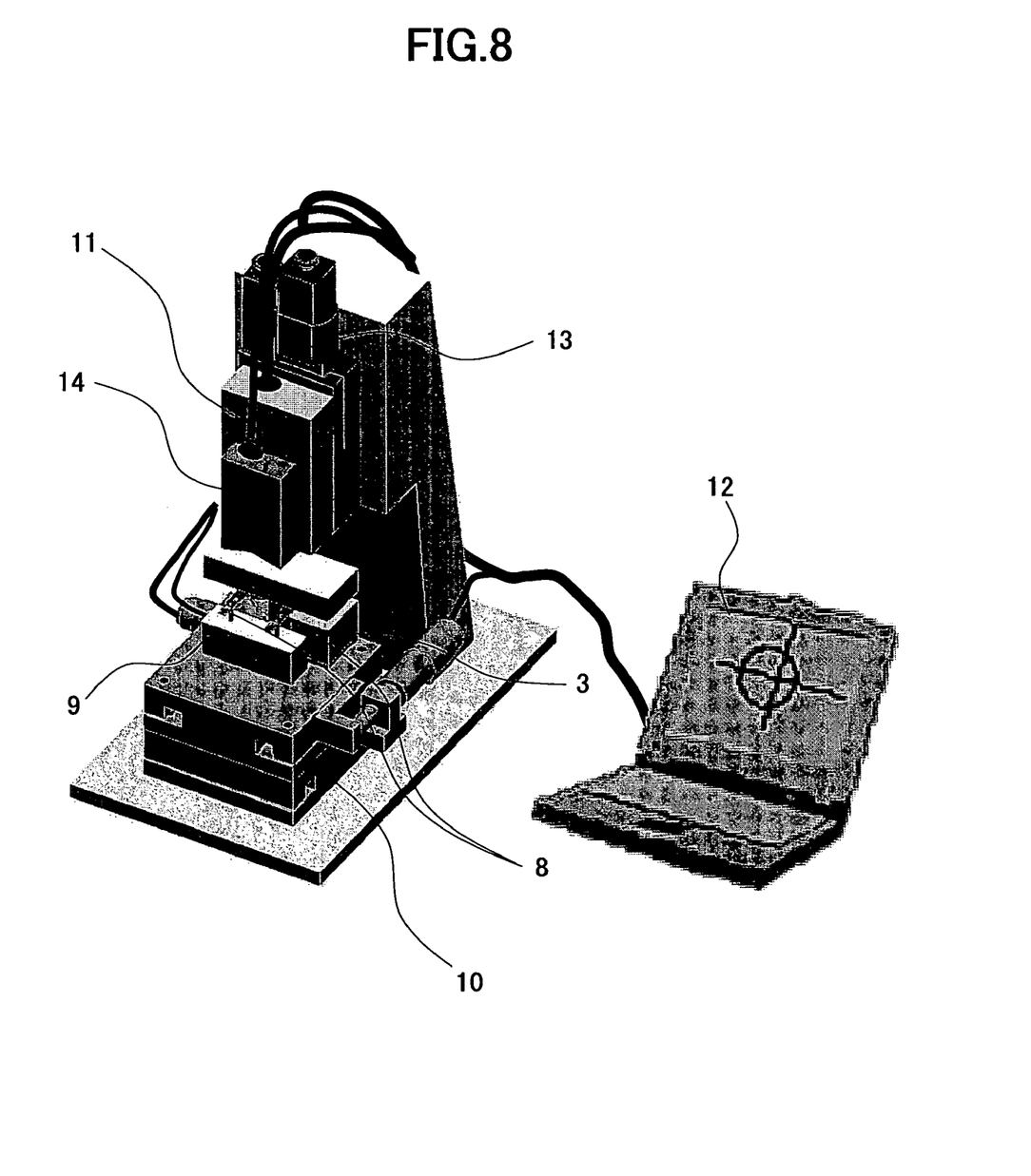
FIG. 8 is a perspective view of the magnetic-disk suspension torsion angle measuring device in the preferred embodiment of the invention.

FIG. 7 shows the composition of the magnetic-disk suspension torsion angle measuring device in the preferred embodiment of the invention. FIG. 8 is a perspective view of the magnetic-disk suspension torsion angle measuring device in the preferred embodiment of the invention. Moreover, FIG. 9 shows the composition of the fixture in the torsion angle measuring device of FIG. 8.

Figure 9:
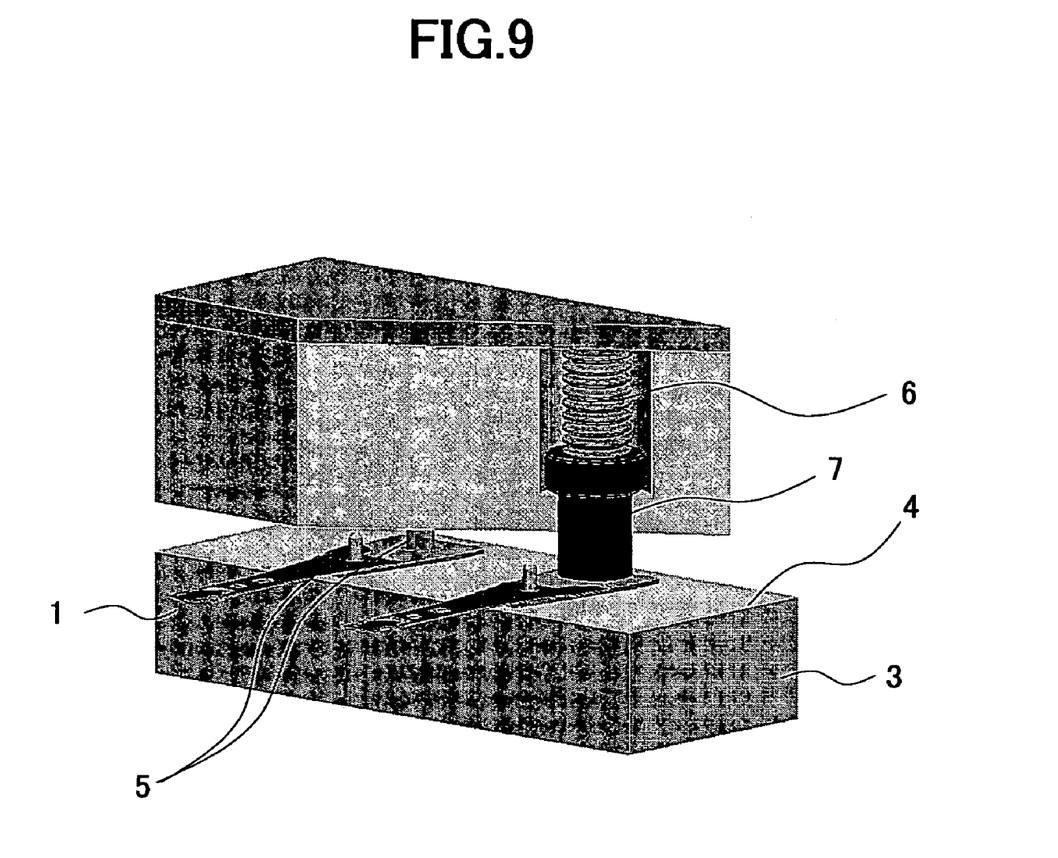
FIG. 9 is a diagram showing the composition of the fixture in the torsion angle measuring device of FIG. 8.

As shown in FIG. 7 through FIG. 9, the torsion angle measuring device of this embodiment comprises the fixture 3, the positioning pins 5, the compression spring 6, the fixing metal 7, the load pin 8, the 3-axial-direction microactuator 9, the XY stage 10, the angle measuring instrument 11, the control unit 12 (a personal computer, etc.), the Z stage 13, the CCD camera, and the displacement gage 14. The control unit 12 is provided to perform the torsion angle measurement procedures as shown in FIG. 6A through FIG. 6C.

The suspension 1 as the measuring object is fixed to the fixture 3 so that the datum surface 2 of the suspension 1 is fitted to the smooth criterion surface 4 of the fixture 3. At this time, the movement of the suspension 1 in the directions of X, Y, and the direction of theta is restrained by setting the two positioning pins 5. The fixture 3 is divided into the upper member and the lower member.

The given pressure of the compression spring 6 provided in the upper member of the fixture 3 is applied to the suspension 1 through the fixing metal 7. The datum surface 2 of the suspension 1 is fitted to the fixture criterion surface 4 so that the suspension 1 is fixed to the fixture 3 under pressure. In addition, the upper member and the lower member of the fixture 3 are integrally secured by the clamper.

When the suspension 1 is fixed to the fixture 3, the load pin 8 comes in contact with the suspension 1 at the reference position thereof, and the suspension 1 is set in the false lifted state.

The load pin 8 can be moved by a minute distance using the 3-axial-direction microactuator 9, and the movement distance of the load pin 8 is controlled by the control unit 12.

The microactuator 9 is controlled to move the load pin 8 only when the relation functions of the amounts of change of the roll angle and the pitch angle in accordance with the load pin displacement which are specific to each suspension are determined.

Moreover, the CCD camera and the displacement gage 14 are controlled by the control unit 12, so that the image of the load pin 8 and the suspension 1 can be acquired and the height measurement can be performed.

In the present embodiment, the plurality of load pins 8 are arranged on one block at intervals of the respective suspensions 1 on the fixture 3.

Moreover, when the relation functions of the amounts of change of the roll angle and the pitch angle according to the load pin displacement, which are specific to each suspension 1, are determined, the microactuator 9 is controlled to move each of the load pins 8 in the directions of X, Y, and Z, respectively, so that the plurality of measurement data of all the suspensions 1 carried on the fixture 3 can be continuously acquired under the same conditions.

The fixture 3 to which the plurality of suspensions 1 are fixed is attached to the XY stage 10. When the XY stage 10 is moved, each suspension 1 is moved to the measurement area of the angle measuring instrument 11, and the respective roll angles and the respective pitch angles of the suspensions 1 are measured individually.

In addition, the angle measuring instrument 11 is attached to the Z stage 13 which is provided to adjust the distance from the suspension 1. The movement of the XY stage 10 and the Z stage 13 is controlled by the control unit 12.

The measurement data from the angle measuring instrument 11 are acquired by the control unit 12, and the compensation values of correction of the roll angle and the pitch angle of each suspension are computed from the position data of the relative positions of the suspension 1 and the load pin 8 which are measured beforehand.

The control unit 12 performs the computation which adds the compensation value to the measurement data (the actual measurement values), and performs the computation which subtracts the torsion angle compensation value from the torsion angle measured value with respect to the measurement position of the load pin. After the computation results are stored, the control unit 12 outputs the true roll angle and the true pitch angle (namely, the actual torsion angles of the suspension 1 when the load pin 8 contacts the suspension 1 at the reference position) to the output device, such as the display monitor.

As described in the foregoing, in the conventional measuring method, both the positioning of the load pin and the measurement of the suspension datum surface have been performed every time the torsion angle measurement of one of the plurality of suspensions on the fixture is performed. In contrast to this, according to the magnetic-disk suspension torsion angle measuring method and device of the of the invention, it is possible to shorten the measurement time remarkably and reduce the measurement error in the torsion angle measurement using the false lifted state.

The present invention is not limited to the above-described embodiments, and variations and modifications may be made without departing from the scope of the present invention.

What is claimed is:

1. A torsion angle measuring method for a magnetic-disk suspension, comprising the steps of:

fixing a datum surface of the suspension to a fixture under pressure, the fixture being provided with a smooth criterion surface having known torsion angles set for the suspension datum surface;

measuring a roll angle and a pitch angle of a slider loading surface of the suspension to the datum surface when the suspension is fixed to the fixture; and setting the suspension in a false lifted state by placing a single load pin having a spherical-form leading edge in contact with the suspension at a reference position thereof; and computing relation functions obtained from amounts of change of the roll angle and the pitch angle of the suspension when a relative position between the suspension and the load pin is changed.

2. The torsion angle measuring method according to claim 1 wherein, when the amount of change of the relative position between the suspension and the load pin is known, approximated measurement values of the roll angle and the pitch angle of the suspension with the load pin being set at the reference position are computed based on the relation functions computed in the computing step and measurement values of the roll angle and the pitch angle actually obtained by performing the measuring step without moving the load pin.

3. A torsion angle measuring device which measures a roll angle and a pitch angle of a slider loading surface of a magnetic-disk suspension to a datum surface of the suspension, comprising:

a fixture provided with a smooth criteria surface having known torsion angles set for the datum surface of the suspension;

a mounting mechanism fixing the datum surface of the suspension to the criteria surface of the fixture under pressure;

a measurement unit measuring a roll angle and a pitch angle of a slider loading surface of the suspension to the datum surface when the suspension is fixed to the fixture;

a single load pin having a spherical-form leading edge;

a load-pin moving unit setting the suspension in a false lifted state by placing the load pin in contact with the suspension at a reference position thereof; and a computation unit computing relation functions obtained from amounts of change of the roll angle and the pitch angle of the suspension when a relative position between the suspension and the load pin is changed.

4. The torsion angle measuring device according to claim 3 wherein, when the amount of change of the relative position between the suspension and the load pin is known, approximated measurement values of the roll angle and the pitch angle of the suspension with the load pin being set at the reference position are computed based on the relation functions computed by the computation unit and measurement values of the roll angle and the pitch angle actually obtained by the measurement unit without moving the load pin.

* * * * *